United States Patent
Mullen

(10) Patent No.: US 6,636,599 B1
(45) Date of Patent: Oct. 21, 2003

(54) RESERVING RESOURCES FOR ANTICIPATED WORK ITEMS VIA SIMULATED WORK ITEMS

(75) Inventor: David Mullen, Newcastle, WA (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/521,795

(22) Filed: Mar. 9, 2000

(51) Int. Cl.[7] .............................................. H04M 3/523
(52) U.S. Cl. .............................. 379/265.05; 379/265.1; 379/266.08; 700/99; 709/104
(58) Field of Search ........................ 379/265.01, 265.02, 379/265.03, 265.04, 265.05, 265.1, 265.11, 265.12, 266.01, 266.06, 266.07, 266.08; 700/99; 709/104, 105

(56) References Cited

U.S. PATENT DOCUMENTS

| | | | | |
|---|---|---|---|---|
| 5,652,791 A | * | 7/1997 | Sunderman et al. ... | 379/265.03 |
| 6,052,460 A | * | 4/2000 | Fisher et al. ........... | 379/265.12 |
| 6,088,441 A | * | 7/2000 | Flockhart et al. ...... | 379/265.12 |
| 6,434,230 B1 | * | 8/2002 | Gabriel ................... | 379/265.01 |
| 6,560,330 B2 | * | 5/2003 | Gabriel ................... | 379/265.02 |

* cited by examiner

Primary Examiner—Harry S. Hong
(74) Attorney, Agent, or Firm—David Volejnicek

(57) ABSTRACT

A workflow-manager (150) reserves a resource for processing an anticipated real work item by sending a simulated, artificial, work item to the resource before the real work item becomes available. The resource does not process the simulated work item, but rather awaits the real work item. When the real work item becomes available, it is substituted for the simulated work item, and the resource processes it. For example, in an ACD system (101) that processes various types of communications, it is anticipated on a per-type basis how many agents (102–104) will be needed (202) versus how many are available (204). Any shortfall is cured by generating (210) tokens representing that many simulated communications of that type and enqueuing, dequeuing, and assigning the tokens to agents like any other arriving communications. Any excess is cured by canceling (210) that many outstanding, pending, tokens of that type. When a real communication of that type arrives (300), it is substituted (312,314) for the oldest token of that type, either in queue or at an assigned agent. To be fair to all agents, an assigned token is periodically reassigned from one agent to an available another agent.

22 Claims, 3 Drawing Sheets

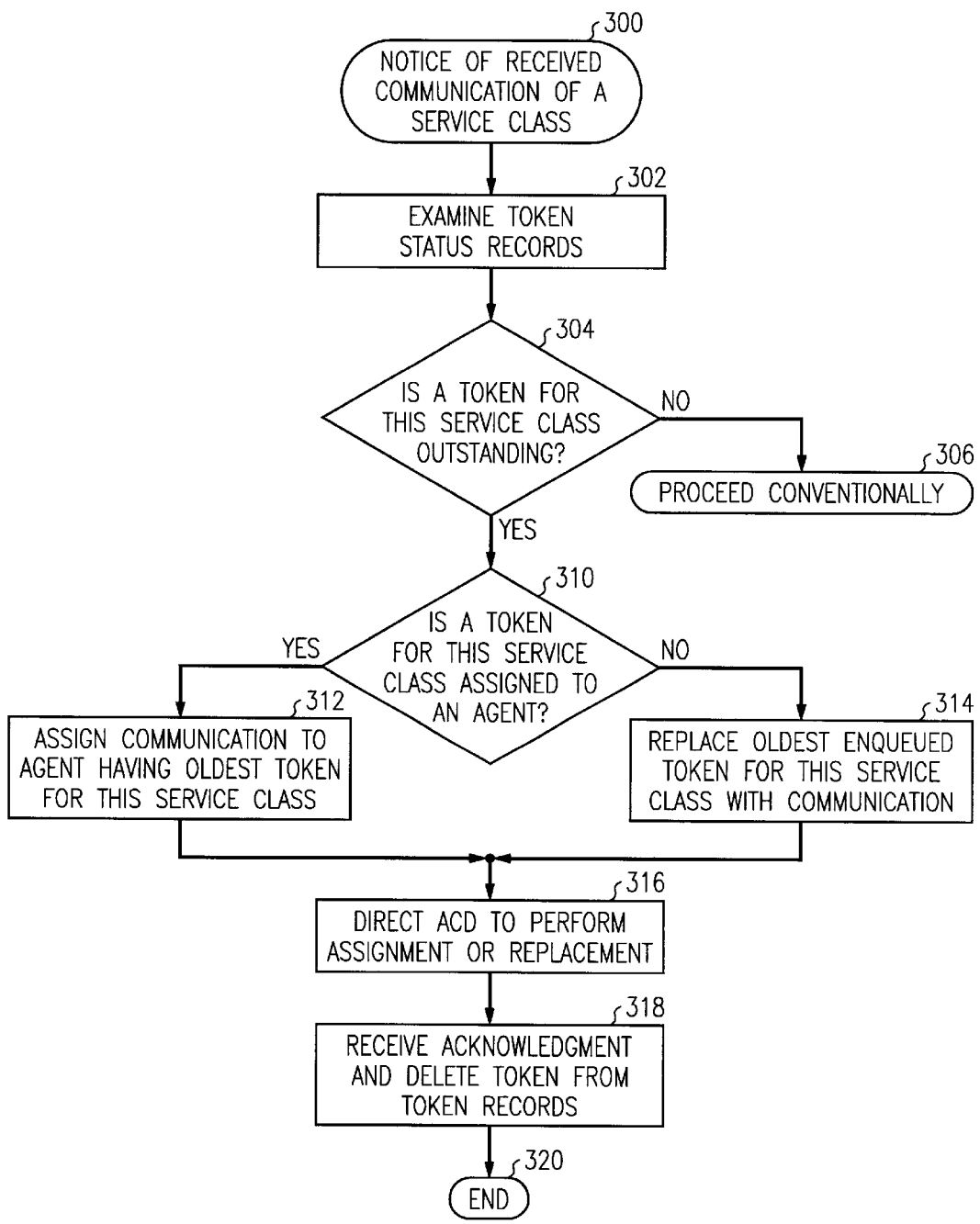

RESERVING RESOURCES FOR ANTICIPATED WORK ITEMS VIA SIMULATED WORK ITEMS

TECHNICAL FIELD

This invention relates to workflow management systems in general, and to automatic call distribution (ACD) systems in particular.

BACKGROUND OF THE INVENTION

Workflow management systems distribute work items for processing among processing resources. An example of workflow management systems are ACD systems. ACD systems distribute communications—telephone calls, for example, whether inbound or outbound—for handling to any suitable ones of available communications-handling agents (whether human or artificial) according to some predefined criteria. In many existing systems, such as the Lucent Technologies Definity® ACD system, the criteria for handling the communication from the moment that the ACD system becomes aware of the communication until the communication is connected to an agent are customer-specifiable (i.e., programmable by the operator of the ACD system) via a capability called call vectoring. Normally in present-day ACD systems, when the ACD system's controller detects that an agent has become available to handle a communication, the controller identifies all predefined communication-handling skills of the agent (usually in some order of priority) and delivers to the agent the highest-priority oldest-waiting communication that matches the agent's highest-priority skill. Generally the only condition that results in a communication not being delivered to an available agent is that there are no communications waiting to be handled.

In many communications-handling centers, agents are members of multiple skills (i.e., multiple agent pools corresponding to different agent skills) or may be assigned work other than handling of communications. When agents are "blended" across more skills or types of work, the utilization of the agents increases, but the capability of differentiating the service provided to different types of work, or to communications versus other types of work, may be diminished. When an agent becomes available, the agent can get the most appropriate work that is presently available. For example, when there are two or more types of available work, the agent can get the work requiring the better service (e.g., high-priority work, such as a telephone call) rather than the work requiring lesser service. But if there is only one type of work available, the agent is typically given that work regardless of the priority of that work compared to other types of work. Then, when the work requiring the better service becomes available, there may be no agent available and ready to handle it.

SUMMARY OF THE INVENTION

This invention is directed to solving this and other problems and disadvantages of the prior art. Generally according to the invention, a workflow manager reserves a resource for processing an anticipated work item by sending a simulated, artificial, work item to the resource before the real work item becomes available. The resource does not process the simulated work item but rather awaits the real item. When the real work item becomes available, it is substituted for the simulated work item and the resource processes it. Specifically according to the invention, managing a workflow includes anticipating a need for a resource to process a real work item, in response sending to the resource a simulated work item to reserve the resource for the real work item, and upon the real work item becoming available for processing, substituting the real work item for the simulated work item to cause the resource to process the real work item instead of the simulated work item. In response to receiving the simulated work item, the resource preferably forbears from processing the simulated work item and rather waits for receipt of the real work item, which it processes in response to the substitution of the real work item for the simulated work item. Advantageously, in anticipation of a need for a plurality of the resources, a plurality of the simulated work items are sent to the plurality of resources, and then upon each of a plurality of real work items becoming available each real work item is substituted for one—preferably the oldest one—of the plurality of simulated work items. The anticipating illustratively involves anticipating how many resources are needed, determining how many resources are available, and then making up any shortfall by sending to the resources that number of the simulated work items. Preferably, any excess of needed resources over available resources is made up by canceling that many pending simulated work items. In a system that processes work items of a plurality of classes or types, the resource reservation is effected on a per-class or per-type basis. In a system where arriving work items are enqueued and then dequeued and assigned to resources—such as an ACD system, for example—the simulated work items are generated and then enqueued, dequeued, and assigned like the real work items. When a real work item arrives, it is either substituted for an enqueued simulated work item in the queue or is assigned for processing to the resource to which a dequeued simulated work item is assigned.

While the invention has been characterized in terms of functions, it encompasses both a method that embodies the function and an apparatus that performs the method. The apparatus preferably includes an effector—any entity that effects the corresponding step, unlike a means—for each step. The invention further encompasses a computer-readable medium containing instructions which, when executed in a computer, cause the computer to perform the method steps.

The invention allows a work-processing operation to utilize resources commensurate with the needs of high-priority work amongst work of lower priority in an environment of differentiated work and differentiated resources. This can greatly facilitate the integration of low-priority work such as back-office work, with high-priority work, such as customer communications-processing. It can help eliminate manual intervention to reallocate resources. Often, manual dispatching is too late and leads to more problems when the reallocated resources are not returned to their preferred work soon enough.

The invention is significant because it enables the realization of high service levels and high resource utilization simultaneously, without undue constraints on the organization of the work and the organization of the resources. The invention can improve customer service and reduce the burden on supervision.

These and other features and advantages of the present invention will become apparent from the following description of an illustrative embodiment of the invention considered together with the drawing.

BRIEF DESCRIPTION OF THE DRAWING

FIGS. 2 and 3 are functional flow diagrams of agent-selection and call-selection procedures, respectively, of a first illustrative embodiment of an agent and call selector of the call center of FIG. 1.

DETAILED DESCRIPTION

Figure 1:
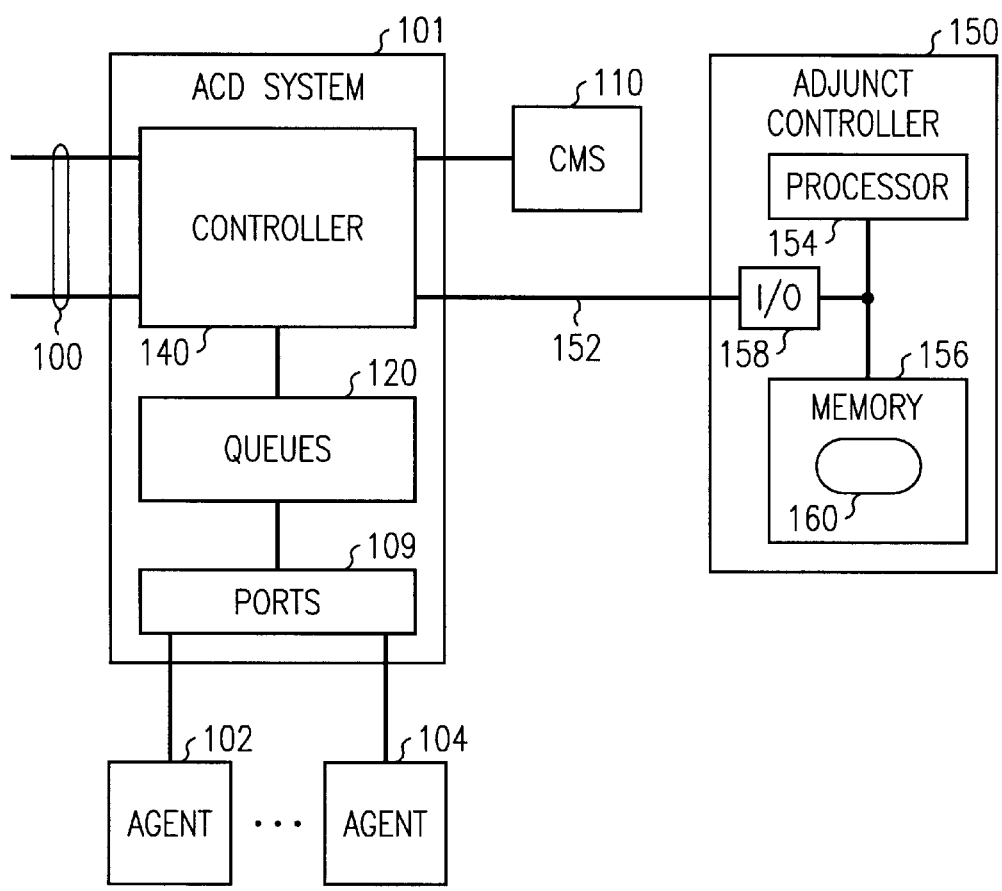
FIG. 1 is a block diagram of a communications-handling center that includes an illustrative embodiment of the invention.

FIG. 1 shows an illustrative communications-handling center. It is a work-processing center whose work items comprise communications and whose processing resources comprise agents, be they human or automated. As is conventional, the center comprises a plurality of telephone lines and/or trunks 100 selectively interconnected with a plurality of agents 102–104 via an ACD system 101. Each agent 102–104 generally has a voice terminal and a data terminal for use in handling communications. Agents 102–104 and their terminals are connected to communications ports 109 of ACD system 101. Also included with ACD system 101 is a conventional call management system (CMS) 110 that gathers communication records and various center statistics for use in managing the center and in generating center reports. ACD system 101 is illustratively a stored-program-controlled system that conventionally includes interfaces to external communications links, a communications switching fabric, service circuits (e.g., tone generators, announcement circuits, etc.), memory for storing control programs and data, and a controller 140 (i.e., a computer) for executing the stored control programs to control the interfaces and the communications switching fabric and to provide automatic communications-distribution functionality. Included among the data stored in ACD system 101 are a set of work queues 120. Each work queue corresponds to a different work type. For example, different work types may reflect the different skills that communications need from the agents for their handling. Conventionally, communications are prioritized, and either are enqueued in individual ones of queues 120 in their order of priority or are enqueued in different ones of a plurality of queues that correspond to a work type and each one of which corresponds to a different priority. Communications incoming to the center on lines or trunks 100 are assigned by controller 140 to different queues 120 based upon the work type that they represent, e.g., the skill that they require for their proper handling. As individual agents 102–104 become available to handle a communication (become idle), controller 140 matches the agents' profiles (e.g., skills) to non-empty queues 120 and distributes communications from those queues 120 to those agents. As described so far, the communications-handling center of FIG. 1 is conventional.

According to the invention, the intelligence and functionality of controller 140 are supplemented by an adjunct controller 150 that is connected to controller 140 by a data communications link 152. Adjunct controller 150 is a conventional computer comprising a processor 154 for executing programs, a memory 156 for storing data and programs 160 for processor 154, and an input/output (I/O) interface 158 to link 152 that enables adjunct controller 150 to communicate with controller 140. Alternatively, adjunct controller 150, and particularly programs 160, may be implemented as programs executing on controller 140.

Adjunct controller 150 dynamically generates requests for agents 102–104 to be reserved for specific types of work (e.g., calls to specific vector directory numbers (VDNs). ACD system 101 interprets each such request as an arrival of a communication of that type. Each request is a simulated, artificial, communication as opposed to a real communication. The request is represented by a token that carries a work-type attribute. ACD system 101 handles this token as it would any arrived communication. The token may be subject to vector control processing and any rules of call distribution, including mapping to agent skills applicable to the work type. Upon receipt of the token, ACD system 101 enqueues it in a queue 120 corresponding to the token's work-type attribute, and when the token reaches the head of that queue 120, dequeues and assigns the token to an idle agent 102–104 having the capability or skill to handle work of the corresponding type (having the corresponding skill in his or her profile). The token indicates to the assigned agent, the agent's workstation, or the agent's proxy in ACD system 101 that it represents a simulated communication, and so the assigned agent refrains from processing the simulated communication and instead awaits arrival of a real communication. Alternatively, the agent is not made aware of his or her assignment to a token (i.e., to an anticipated work item) and merely remains idle, while ACD system 101 forbears from assigning any other work to the agent. The call part of the connection could reserve the agent via communication with the agent's display voice terminal while the real work item arrives via a screen pop to the agent's terminal; when the agent is merely reserved, he or she has no screen pop. When a real communication of the subject work type arrives, then the real communication is substituted for the token, the agent is alerted, and the agent proceeds to process the real communication.

A work-processing center that runs in this fashion does not indiscriminately waste resources by assigning too many agents to higher-priority tasks. Instead, it allocates agents dynamically commensurate with the need at the margin for ready agents. It is not so important to consider grossly how many agents are allocated to a given type of work; rather, it is more important to consider how many agents are presently ready to handle a new item of that work type. Additionally, the generation or distribution of the simulated work item is subject to dynamic adjustments under the control of a service-level controller such as service controller 150 or a separate adjunct controller, or even to manual interventions.

The system can use a variety of means to determine how many agents to reserve. It can be based on dynamic conditions in the communications traffic or agent population, and forecast or realized service measures. For service classes corresponding to work types, adjunct controller 150 may make certain agents 102–104 idle to provide sufficient available resources to meet service objectives. For example, if agent handling time for a service class of un-interruptible work is five minutes, and there are only five agents available to support arrivals of communications, and all five agents are performing this un-interruptible work when a communication arrives, then on average the. communication will not be answered by an agent in less than one minute. If the service goal is, say, 90% of communications answered in 10 seconds, this objective cannot be met as long as the agents are performing un-interruptible work. However, if adjunct controller 150 can reserve agents to meet the aforementioned service level objective—that is, make them idle in anticipation of arrival of a communication—then the service-level objective may be met, depending upon the arrival rate of the communications.

Reserved agents are idle, so there is a need to maintain no more reserved agents than are needed. More idle agents than are needed cause less-efficient utilization of resources. Because there can be several different reasons why an agent will enter the idle state, there may be a need to identify the reason for reporting purposes: accordingly, an idle agent may be designated as QUEUED_READY, meaning that there is presently no work of any kind for the agent to perform; or RESERVE_QUEUED_READY, meaning that the agent is reserved for work of a specific service class.

Figure 2:
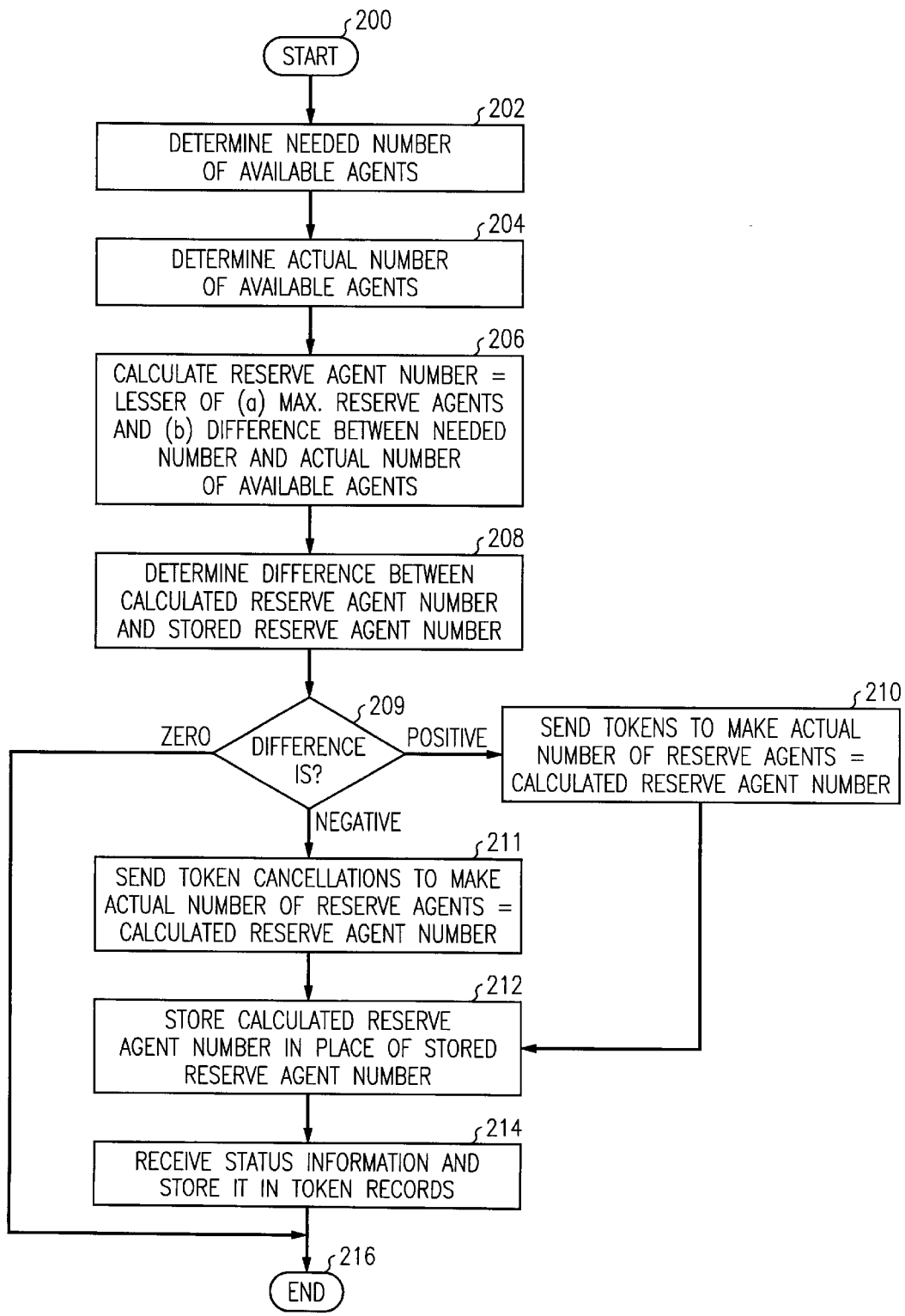

The number of reserved agents for a particular service class will vary at any one time from zero to a Max Reserve Agent parameter established by administration of program 160. The instantaneous required number of agents to reserve for a service class is referred to as the calculated Reserve Agent number. The Reserve Agent number is calculated by adjunct controller 150 under control. of program 160. The functionality effected by program 160 is shown in FIG. 2. For each service class, e.g., each work type, controller 150 anticipates the number of agents that need to be available to meet service objectives, as explained above, at step 202. Controller 150 determines from controller 140 how many agents 102–104 who serve this service class are or will be available, at step 204. The number of agents available for a service class may depend on the outlook for the number of agents needed for other kinds of work, especially for work of a higher priority than the subject service class and when the agent skill organization is much different from the organization of the types of work or service classes. Controller 150 then calculates a new Reserve Agent number for this service class as the lesser of (a) the Max Reserve Agents for this class and (b) the difference between the numbers determined at steps 202 and 204, at step 206. Controller 150 then determines the difference between the newly calculated Reserve Agent number and a stored Reserve Agent number that indicates how many agents are presently reserved for this service class, at step 208. If the calculated Reserve Agent number equals the stored Reserve Agent number, i.e., the difference is zero as determined at step 209, no adjustment is needed and so program 160 ends its operation, at step 216. If the calculated Reserve Agent number exceeds the stored Reserve Agent number, i.e., the difference is positive as determined at step 209, controller 150 sends that many tokens identifying this service class to ACD system 101 in order to rectify the shortfall of reserved agents and bring the actual number of agents reserved for this service class into correspondence with the new Reserve Agent number, at step 210. If the calculated Reserve Agent number is smaller than the stored Reserve Agent number, i.e., the difference is negative as determined at step 209, controller 150 sends that many token cancellations identifying this service class to ACD system 101 in order to rectify this excess of reserved agents and bring the actual number of agents reserved for this service class into correspondence with the new Reserve Agent Number, at step 211. Following step 210 or 211, controller 150 stores the new Reserve Agent number in place of the previously-stored Reserve Agent number, at step 212.

As was mentioned previously, ACD system 101 treats the tokens as arriving communications of the service class indicated by the tokens' work-type attribute, and enqueues and distributes them accordingly. ACD system 101 reports the present status of each communication in general, and of each token in particular, to controller 150, which receives and stores the status information, at step 214. Since it knows the present status of individual tokens, controller 150 sends token cancellations of particular (generally the oldest) tokens to ACD system 101 at step 210. ACD system 101 performs and reports the cancellations to controller 150, which receives them and updates its status information with them, at step 214. The Reserve Agent calculation then ends for this service class, at step 216, only to be repeated again either periodically or following occurrence of a status-affecting event.

There is usually a desire to ensure that the longest-idle agent is provided the next received communication of the service class. That is, if agents A, B, C serving service class X have respectively been made idle at t0, t0+10 seconds, and t0+30 seconds, then agent A should get the next work item from service class X. This queuing of idle agents can be viewed as a first-in/first-out (FIFO) queue. Of course, given that there is likely to be no more than one idle agent required at any one time, this will be a very small queue, typically of length one. If agents are not queued, another suitable means may be used to ensure that the longest-idle agent will receive the next work item. To ensure that the proper idle agent is assigned to handle the next. received communication of a service class, agent-to-communication assignment is effected by ACD system 101 under control of adjunct controller 150 executing program 160. This functionality effected by program 160 is shown in FIG. 3.

Upon arrival of any communication, ACD system 101 notifies adjunct controller 150, at step 300. Upon receipt of this notification, which identifies the service class of the communication, controller 150 examines token status reports for this service class, at step 302, to determine if a token for this service class is pending, i.e., possessed by ACD system 101, at step 304. If not, controller 150 proceeds conventionally, at step 306. For example, controller 150 merely informs ACD system 101 to handle the call conventionally, on its own. If there is a token outstanding for this service class, controller 150 determines from the token status records whether a token for this service class is assigned to an agent 102–104, at step 310. If so, controller 150 assigns the received communication to the agent who has the oldest token for this service class, at step 312, and directs ACD system 101 to perform this assignment, at step 316, thereby replacing the token with the communication. If a token for this service class is not assigned to an agent, controller 150 replaces the oldest enqueued token for this service class with the received communication, at step 314, and directs ACD system 101 to perform this replacement in the corresponding queue 120, at step 316. Controller 150 then awaits receipt of an acknowledgment from ACD system 101 that the commanded assignment or replacement has been performed, and upon receipt of the acknowledgment it updates the token records by deleting that token from those records, at step 318, and then ends its operation, at step 320.

While in an idle state, agents are not performing any useful work. They are idle because there is no work, or they are idle because they have been reserved. In the latter case, it is possible that, at the moment when the agent is reserved, the service class for which the agent is reserved is no longer receiving work. This would cause the agent to remain idle and receive no work substantially forever. For this reason, the implementation of the reserve-agent feature could provide a means for "un-reserving" the agent in the event that reservation of the agent is no longer required. This un-reserving of an agent would occur whenever the calculated Reserve Agent parameter goes to a value of zero by triggering the agent selection process of FIG. 2. Also, while an agent is reserved, if calls only arrive sporadically, the agent could remain idle for a long period of time while other agents are engaged in performing other work. For the purpose of "fairness"—to keep agents more uniformly occupied in performing work—an important variation of the basic method is the dynamic reassignment of the reserved-agent token. In this method, ACD system 101 considers the agent reservation to be an undesirable "hot potato" that should be passed from one agent to another. The purpose of this is to preclude the disproportionate assignment of idle time to some of the agents. Without this scheme, an agent could be reserved all day for an important event that never happens. Typically, the agent reservation is reassigned when a new agent satisfying the criteria for the reservation becomes available. The reservation token is not distributed to the first-reserved agent again until that agent becomes available again following the processing of another work item. Thus, when an agent becomes available who can be reserved for a particular service class and the calculated Reserve Agent number is equal to the number already reserved for this service class, two actions occur: the longest-idle agent is released from being reserved, and the identified newly-available agent becomes reserved instead. These actions cause agents to be constantly cycled through the idle-agent pool. From an agent's perspective, the result of these actions is that he or she is really not being made any more idle than any other agent. In fact, it may not be necessary to inform the agent that he or she is being made idle.

Of course, various changes and modifications to the illustrative embodiment described above will be apparent to those skilled in the art. For example the invention may be used to integrate outbound call systems with inbound call systems and other workflow systems. Or, it can help integrate various kinds of channels for receipt of work; such as integration of telephony, internet, postal mail, and walk-in communications channels. It can integrate various types of work performed based on temporal constraints such as integration of front office (call-type work) with back office (fulfillment work). It can integrate direct revenue-production work with overhead functions such as training. Also, the agent can be given discretion on the reservation; the agent could abandon his or her reserved state in favor of other available work. The invention can also be used in cases where uninterruptible work and interruptible work can be interspersed dynamically. It could help integrate various dispatcher functions with call flow and work flow, wherein the dispatcher functions could send the agent away from his or her workstation to perform some task, or call an on-call agent back into the office from his home or elsewhere. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of managing a workflow, comprising:
   anticipating a need for a resource to process a real work item;
   in response, sending to the resource a simulated work item to reserve the resource for the real work item; and
   in response to the real work item becoming available for processing, substituting the real work item for the simulated work item to cause the resource to process the real work item instead of the simulated work item.
2. The method of claim 1 further comprising:
   in response to receiving the sent simulated work item, the resource waiting for receipt of a real work item for processing.
3. The method of claim 2 further comprising:
   in response to the substituting, the resource processing the real work item.
4. The method of claim 2 further comprising:
   in response to another resource coming available, reassigning the simulated work item from the receiving resource to the other resource.
5. The method of claim 1 wherein:
   anticipating comprises
   anticipating a need for a plurality of resources to process real work items;
   sending comprises
   sending to the plurality of resources a plurality of simulated work items; and
   substituting comprises
   in response to each of a plurality of real work items becoming available for processing, substituting each said real work item for one of the plurality of simulated work items.
6. The method of claim 1 wherein:
   substituting each said real work item comprises
   substituting each said real work item for an oldest one of the plurality of simulated work items.
7. The method of claim 1 wherein:
   sending comprises
   generating the simulated work item, and
   assigning the simulated work item to the resource.
8. The method of claim 1 wherein:
   anticipating comprises
   anticipating a number of resources needed to process real work items; and
   sending comprises
   sending to the resources said number of simulated work items.
9. The method of claim 1 wherein
   anticipating comprises
   anticipating how many resources are needed to process real work items, and
   determining how many resources are available to process real work items; and
   sending comprises
   if anticipated resources exceed determined resources, sending to the resources a first number of simulated work items.
10. The method of claim 9 wherein:
    sending a first number of simulated work items comprises
    sending the first number of simulated work items to the first number of resources, wherein the first number is a difference between a number of the anticipated resources and a number of the determined resources.
11. The method of claim 9 wherein:
    sending further comprises:
    if determined resources exceed anticipated resources, canceling a second number of pending said simulated work items.
12. The method of claim 11 wherein:
    the second number is the smaller of (a) a difference between a number of the anticipated resources and a number of the determined resources, and (b) a number of pending simulated work items.
13. The method of claim 9 wherein:
    sending further comprises
    if determined resources exceed anticipated resources, canceling a second number of pending said simulated work items.
14. The method of claim 13 wherein:
    the second number is the smaller of (a) the anticipated resources and (b) the number of pending simulated work items.
15. The method of claim 1 further comprising:
    enqueuing work items that arrive for processing in at least one queue, and dequeuing enqueued work items for assignment to resources and processing by the assigned resources; wherein sending comprises sending the simulated work items for enqueuing and dequeuing and assignment like an arriving real work item; and substituting comprises in response to the real work item arriving, determining if the simulated work item is enqueued or dequeued and assigned in response to determining that the simulated work item is enqueued, substituting the real work item for the simulated work item in the queue where the simulated item is enqueued, and in response to determining that the simulated work item is dequeued and assigned, assigning the real work item as a substitute for the simulated work item for processing to the resource to which the simulated work item is assigned.

16. The method of claim 15 further comprising:

in response to assignment of the simulated work item to the resource, the resource forbearing from processing the simulated work item and waiting for assignment of the real work item thereto.

17. The method of claim 1 further comprising:

enqueuing work items of a plurality of types that arrive for processing each in one of a plurality of queues that corresponds to the work type of that arriving work item, and dequeuing enqueued work items from each queue for assignment to resources capable of processing work items of the work type corresponding to that queue, and processing by the assigned resources; wherein anticipating comprises anticipating a need for a resource capable of processing a real work item of a first type, sending comprises generating a simulated work item of the first type, and sending the simulated work item of the first type for enqueuing and dequeuing and assignment like an arriving real work item; and substituting comprises in response to a real work item of the first type arriving, determining if the simulated work item of the first type is enqueued or dequeued and assigned in response to determining that the simulated work item is enqueued, substituting the real work item for the simulated work item in the queue corresponding to the first type; and in response to determining that the simulated work item is dequeued and assigned, assigning the real work item as a substitute for the simulated work item for processing to the resource capable of processing work items of the first type to which the simulated work item is assigned.

18. The method of claim 17 further comprising:

in response to assignment of the simulated work item of the first type to the resource, the resource forbearing from processing the simulated work item and waiting for assignment of the real work item of the first type, and in response to a second resource capable of processing work items of the first type becoming available, reassigning the simulated work item of the first type from the resource to which it is assigned to the other resource.

19. An apparatus that performs the method of one of claims 1–18.

20. A computer-readable medium containing instructions which, when executed in a computer, cause the computer to perform the method of one of claims 1–18.

21. A workflow-management apparatus comprising:

an anticipator of a need for a resource to process a real work item;

a sender of simulated work items, cooperative with the anticipator and responsive to an anticipated future need for the resource by sending to the resource a simulated work item to reserve the resource for the real work item; and a substitutor of real work items, cooperative with the sender and responsive to the real work item becoming available for processing by substituting the real work item for the simulated work item to cause the resource to process the real work item instead of the simulated work item.

22. The apparatus of claim 21 wherein:

the work items comprise communications.

* * * * *